United States Patent
Byrne et al.

(10) Patent No.: US 9,330,115 B2
(45) Date of Patent: May 3, 2016

(54) AUTOMATICALLY REVIEWING INFORMATION MAPPINGS ACROSS DIFFERENT INFORMATION MODELS

(75) Inventors: Brian Patrick Byrne, Austin, TX (US); Achille Belly Fokoue-Nkoutche, White Plains, NY (US); Aditya Anand Kalyanpur, Westwood, NJ (US); Kavitha Srinivas, Rye, NY (US); Min Wang, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 642 days.

(21) Appl. No.: 12/851,963

(22) Filed: Aug. 6, 2010

(65) Prior Publication Data
US 2012/0036110 A1  Feb. 9, 2012

(51) Int. Cl.
*G06F 17/30* (2006.01)
*G06F 7/00* (2006.01)

(52) U.S. Cl.
CPC ................................ *G06F 17/30289* (2013.01)

(58) Field of Classification Search
None
See application file for complete search history.

(56) References Cited

U.S. PATENT DOCUMENTS

| | | | |
|---|---|---|---|
| 5,790,778 A | 8/1998 | Bush et al. | |
| 2003/0172368 A1* | 9/2003 | Alumbaugh et al. | 717/106 |
| 2005/0050068 A1* | 3/2005 | Vaschillo et al. | 707/100 |
| 2005/0086360 A1 | 4/2005 | Mamou et al. | |
| 2005/0262190 A1 | 11/2005 | Mamou et al. | |
| 2005/0267795 A1 | 12/2005 | Tian et al. | |
| 2006/0206883 A1 | 9/2006 | Sabbouh | |
| 2007/0276787 A1* | 11/2007 | Piedmonte | 707/2 |
| 2008/0071731 A1* | 3/2008 | Ma et al. | 707/2 |
| 2009/0119268 A1* | 5/2009 | Bandaru et al. | 707/3 |
| 2010/0049766 A1* | 2/2010 | Sweeney et al. | 707/737 |

OTHER PUBLICATIONS

Falconer, "Cognitive support for semi-automatic ontology mapping," University of Victoria (PhD Thesis), 2009, pp. 1-219.
Doran, et al., "Dynamic Selection of Ontological Alignments: A Space Reduction Mechanism," 21st Int'l Joint Conf. on Artificial Intelligence (IJCAI-09), Jul. 11-17, 2009.
Quix, et al., "Matching of Ontologies with XML Schemas Using a Generic Metamodel," On the Move to Meaningful Internet Systems 2007, 2009, pp. 1081-1098.
Fagin, et al., "Clio: Schema Mapping Creation and Data Exchange," Conceptual Modeling: Foundations and Applications, 2009, pp. 198-236.
Tous, "Data integration with xml and semantic web technologies," Universitat Pompeu Fabra (Thesis paper), Jun. 2006, pp. 1-159.
Heymans, et al., "Ontology Reasoning with Large Data Repositories," Ontology Management, 2008, pp. 89-128.

* cited by examiner

*Primary Examiner* — Sangwoo Ahn
(74) *Attorney, Agent, or Firm* — Cantor Colburn LLP; Nidhi Kisson

(57) ABSTRACT

A computer-implemented method, system, and program product for automatically reviewing a mapping between information models. The method includes: receiving a mapping between an element in the first information model to an element in the second information model. Each element is associated with an element identifier and an element value, and the mapping signifies a relationship between the element in the first information model and the element in the second information model. The method further includes comparing the received mapping against one or more known indications of suspicious mappings to determine if the received mapping resembles one of the indications of suspicious mappings. If the received mapping is determined to be suspicious, identifying the received mapping as one that requires review.

15 Claims, 15 Drawing Sheets

AUTOMATICALLY REVIEWING INFORMATION MAPPINGS ACROSS DIFFERENT INFORMATION MODELS

BACKGROUND OF THE INVENTION

The present invention relates generally to a method and system of automatically reviewing information mappings across different information models. More particularly, the present invention relates to a tool that reviews the quality of mappings by identifying erroneous mappings between information models.

An information model is a way of representing and managing information, such as data, relationships, services, and processes, in data processing systems for a particular domain or enterprise. Every day, organizations deal with a myriad of different semantic expressions in key information, and expend huge resources working around the inconsistencies, challenges and errors introduced by so many varying information models. Examples of information models are Entity-Relationship (ER) models, Unified Modeling Language (UML) models, Eclipse Modeling Framework (EMF) models, thesauri, ontologies or Extensible Markup Language (XML) schema.

These varying models rarely share a common terminology, because they have emerged as a result of several inputs. In some cases, mergers of organizations operating in the same industry result in different information models to express the same exact concepts. In other cases, they may have been developed by different individuals to express overlapping industry concepts, but in slightly different domains.

Irrespective of the means through which these models came about, today's organizations utilize many different information models and face an increasing need to integrate across these models, through data integration, shared processes and rules, or reusable services. In all of these cases, the ability to relate, or map, between elements of different information models is a critical foundation stone in addressing these challenges.

A mapping between information models involves the matching of elements of the models, which can be based on, for example, lexical names, semantics, and/or other attributes. Both a user attempt to manually map and a computer-automated attempt to map different information models are error prone.

In user attempts, one source of the error comes from the size of these models (typically, these models have several thousand elements each) and the fact that the lexical name of the elements rarely match, or when they do match, it is because of the wrong reasons (e.g., a document may have an "endDate" attribute, as does a claim, but the two "endDate" attributes reflect semantically different things, although they match at the lexical level). A second source of error in user attempts is that the models often express different levels of normalization. For example, in one environment a concept may be expressed at a very specific level of sub-typing, such as "Mortgage Credit Specialist". In another environment, that same concept may be expressed at a much higher level, such as "Financial Services Role". This introduces a complexity into the mapping where the concepts being mapped are at very different levels of specification, which can be very difficult to maintain across multiple systems. A frequent user's response to this difference in normalization is a tendency to map everything to these generic structures. Taking an extreme example, if a target model contains "thing", it is very tempting for an analyst to interpret everything in the source as an instance of a "thing" and perform all mappings at this level. While the mapping is technically not invalid, mappings at this level are not useful to downstream initiatives, and mappings like this significantly affect the quality of the mapping results.

In computer-automated attempts, the mapping process is also error prone. As an example, model-matching algorithms may consider the descriptions for a given element in their matching process to aid matches across items that match semantically but do not match lexically. Frequently, however, the descriptions of these elements are duplicated or copied across multiple elements. Such an algorithm will likely produce a number of false positives because of the duplication of documentation.

SUMMARY OF THE INVENTION

Embodiments of the present invention describes a method and system to automatically review mappings between information models.

According to one embodiment of the present invention, a computer-implemented method is provided for automatically reviewing a mapping between information models. The method includes reviewing a mapping between a first information model and a second information model. The mapping is received between an element in the first information model to an element in the second information model. Each element is associated with an element identifier and an element value, and the mapping signifies a relationship between the element in the first information model and the element in the second information model. The received mapping are compared against one or more known indications of suspicious mappings to determine if the received mapping resembles one of the indications of suspicious mappings. If the received mapping is determined to be suspicious, received mapping is identified as one that requires review.

According to another embodiment of the present invention, a computer-implemented system is provided for automatically reviewing a mapping between information models. The system includes: an information receiving unit for receiving content from a first and a second information model and for receiving an indication of a known suspicious mapping; an analyzing unit for analyzing the mapping between the information models based on the indication of a suspicious mapping to determine if the mapping is suspicious, and an identifying unit for identifying the mapping as one that requires review if the mapping is determined to be suspicious. The content from the first information model has been mapped to the second information model. The content from the models each contain at least one element that has a field identifier and a value associated with the element. The mapping is based on a matching of the element in the first information model and to the element in the second information model.

In still another embodiment of the present invention, a computer program product is provided for automatically reviewing a mapping between information models. The computer program product includes computer program instructions for carrying out the steps of the method.

BRIEF DESCRIPTION OF THE DRAWINGS

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The following figures are included.

DETAILED DESCRIPTION

Embodiments of the invention include a technique for providing an automated review of mappings in a complex mapping domain to reveal large sets of inaccurate and misleading or suspicious mappings. According to embodiments, a computer-implemented system is provided for automatically reviewing mappings between information models. Embodiments involve identifying a set of suspect mappings on the basis of common mapping anti-patterns. Examples of these anti-patterns include patterns such as a large number of mappings to a single generic type (i.e. a tendency to map a generic level), duplication of documentation across elements of a model, mapping elements that do not exist in either model (either due to mistyping of element names, inaccurate specification of packages within which the elements lie, or creation of entirely new elements as placeholders for new elements in the model, and so on). This means that large mapping sets can be programmatically assessed and that manual review can be focused instead on specific sets of suspect mappings, resulting in much higher quality and accurate mapping review that is less time consuming. Alternatively, the automated review can be used to filter out suspect mappings from a tool, thus increasing the precision of the tool produced mappings.

It will be readily understood that the embodiments of the present invention, as generally described and illustrated in the figures herein, may be arranged and designed in a wide variety of different configurations in addition to the described presently preferred embodiments. Thus, the following detailed description of the embodiments of the present invention, as represented in the figures, is not intended to limit the scope of the invention, as claimed, but is merely representative of selected presently preferred embodiments of the invention. The following description is intended only by way of example, and simply illustrates certain selected presently preferred embodiments of the invention as claimed herein.

Figure 1:
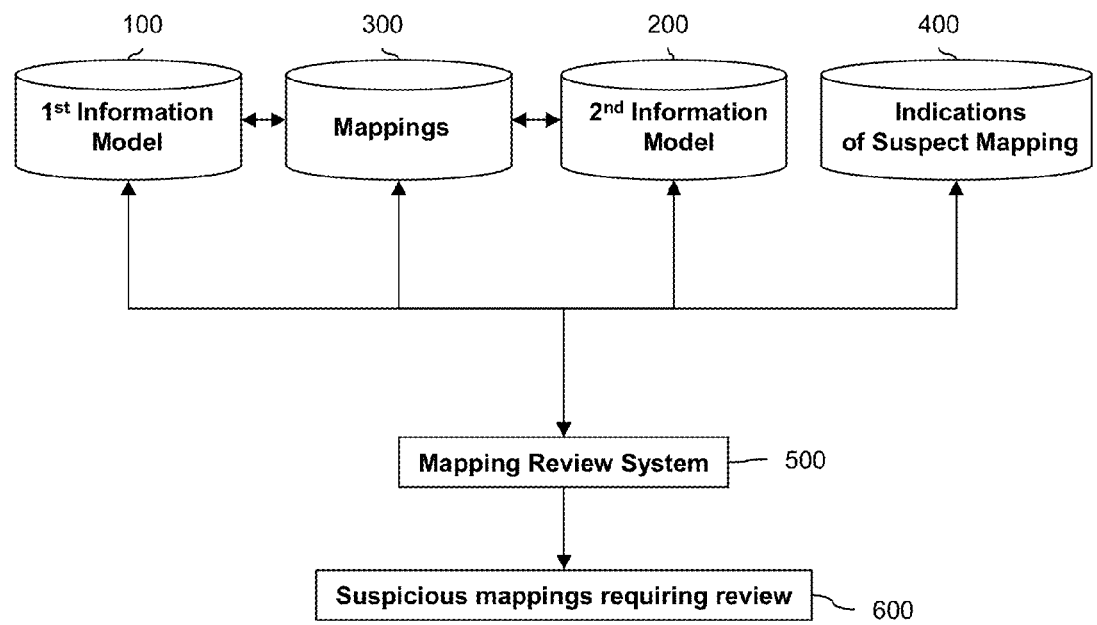
FIG. 1 is a block diagram that illustrates a computer-implemented system for automatically reviewing mappings between information models, according to embodiments of the present invention.
Figure 3:
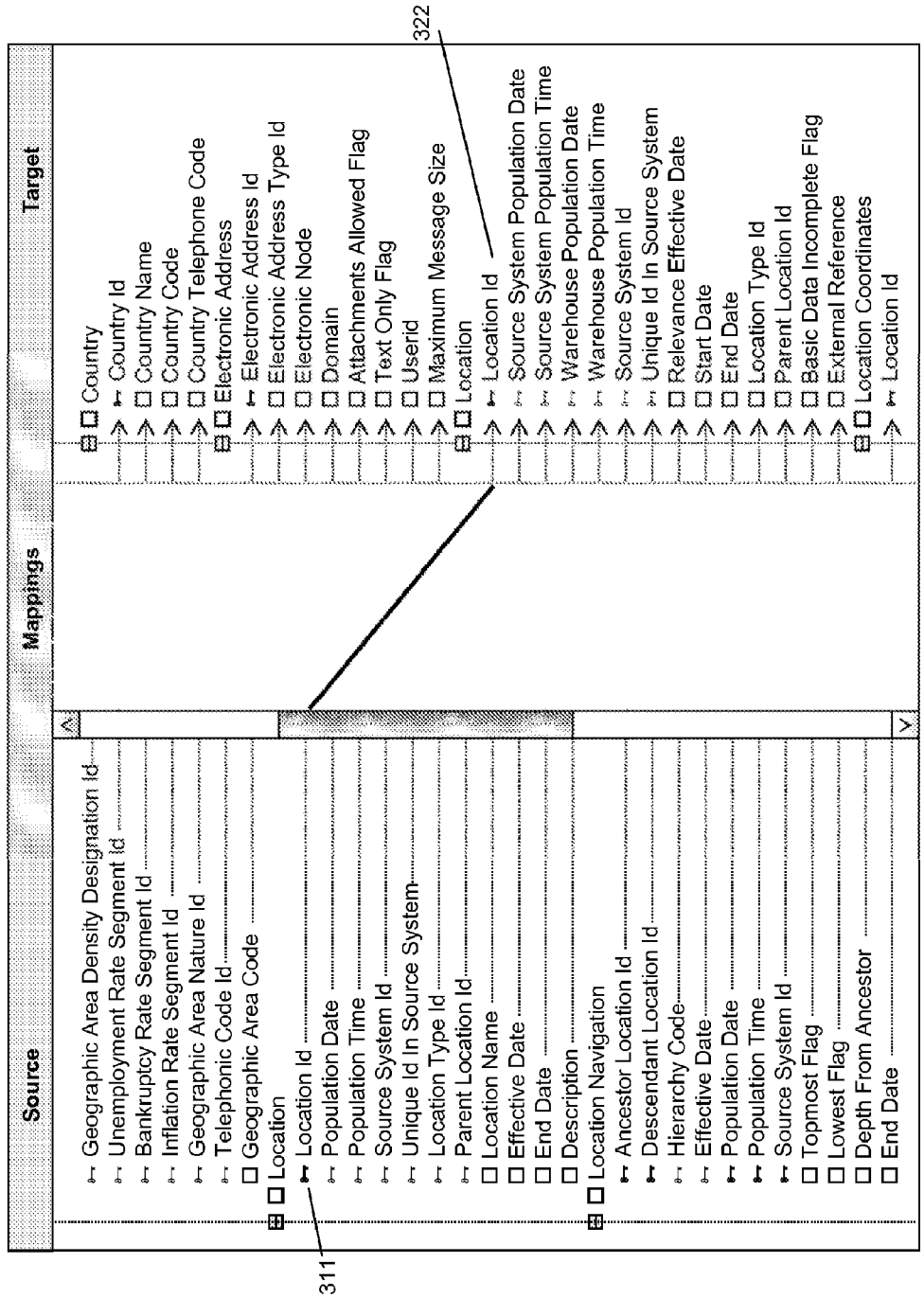
FIG. 3 shows an example of a set of mappings between two information models, the IBM Rational Data Architect (RDA) model and the IBM Banking Data Warehouse (BDW) model, according to an embodiment of the present invention.

FIG. 1 is a block diagram that illustrates a computer-implemented system for automatically reviewing mappings between information models according to embodiments of the present invention. Referring to FIG. 1, the mapping review system 500 receives content from a first information model 100, content from a second information model 200, information about a mapping between the two models from a database of mappings 300, and information regarding an indication of a suspicious mapping from a database 400. Mapping review system 500 is typically implemented in a computer system, examples of which are shown in the figures discussed below. An example of a set of mappings 300 between two information models, such as first information model 100 and second information model 200, is shown in FIG. 3. For example, the information models shown in FIG. 3 may be the IBM Rational Data Architect (RDA) model and the IBM Banking Data Warehouse (BDW) model. RDA is an tool for logical and physical data modeling, database/XML design and data mapping. The BDW is a comprehensive set of business models that represent best practice in the banking industry, and it provides an information architecture blueprint with detailed content. As can be appreciated by a person of skill in the art, these information models (and others like them) typically organize similar data in different ways as dictated by design considerations.

In FIG. 3, each of the information models may contain a series of elements, as discussed below, and one example of a mapping may be from the "location id" element 311 in the first information model to the "location id" element 322 in the second information model. In deployed systems, the information models may contain thousands of elements and these elements may have many common components as between the two models. In a typical deployment, and as suggested by FIG. 3, there may be thousands of mappings between elements of the two information models. These mappings may be stored in database 300, as discussed below.

Returning to FIG. 1, in a common situation, one division of an enterprise XYZ Corp. may have organized its data in a first computer system according to the first information model (e.g., because it used the RDA tool) and another division of XYZ Corp. may have organized its data in a second computer system according to the second information model (e.g., using BDW). This divergence may have occurred for historical reasons, such as that the system became part of the enterprise as part of an acquisition. In such an example, it may become necessary or desirable for the enterprise to create a mapping between the two data models so that the two computer systems can share their data. In such a case, the mapping 300 may be created either manually or automatically as described above. As also described above, such mappings often contain errors.

According to the present invention, the indications of suspect mappings 400 contains mapping types that have been determined, such as by observation and experimentation, to be likely suspicious mappings. These indications of suspect mappings (or anti-patterns) can be predefined as those explicitly mentioned in FIG. 4A. They can be learned from the mappings that are consistently rejected by the user during the review of the suspicious mappings. They can also be explicitly specified by the user. In embodiments, the first and second information models 100 and 200, the mappings 300, and the indications of suspicious mappings 400 are all stored in a data storage device that is associated with mapping review system 500, such as in one or more of a hard disk drive, random access memory, tape memory, ext. In addition or as an alternative, the system 500 may receive information, such as an indication of a suspicious mappings, from a user (not shown). In operation, the invention may only take as inputs mappings 300 and indications of suspicious mappings 400, but information models 100 and 200 are shown in FIG. 1 for context. The system 500 analyzes the mapping between the first information model 100 and the second information model 200 from the database of mappings 300 by running through the database of indications of a suspicious mapping 400 to determine if the mapping is suspicious. If the mapping is determined to be suspicious, the system 500 identifies the mapping as a suspicious mapping that requires review 600. The suspicious mapping that requires review 600 may be output to a data file, printed, ext, for later automated or manual analysis to correct errors in mapping 300.

Figure 2:
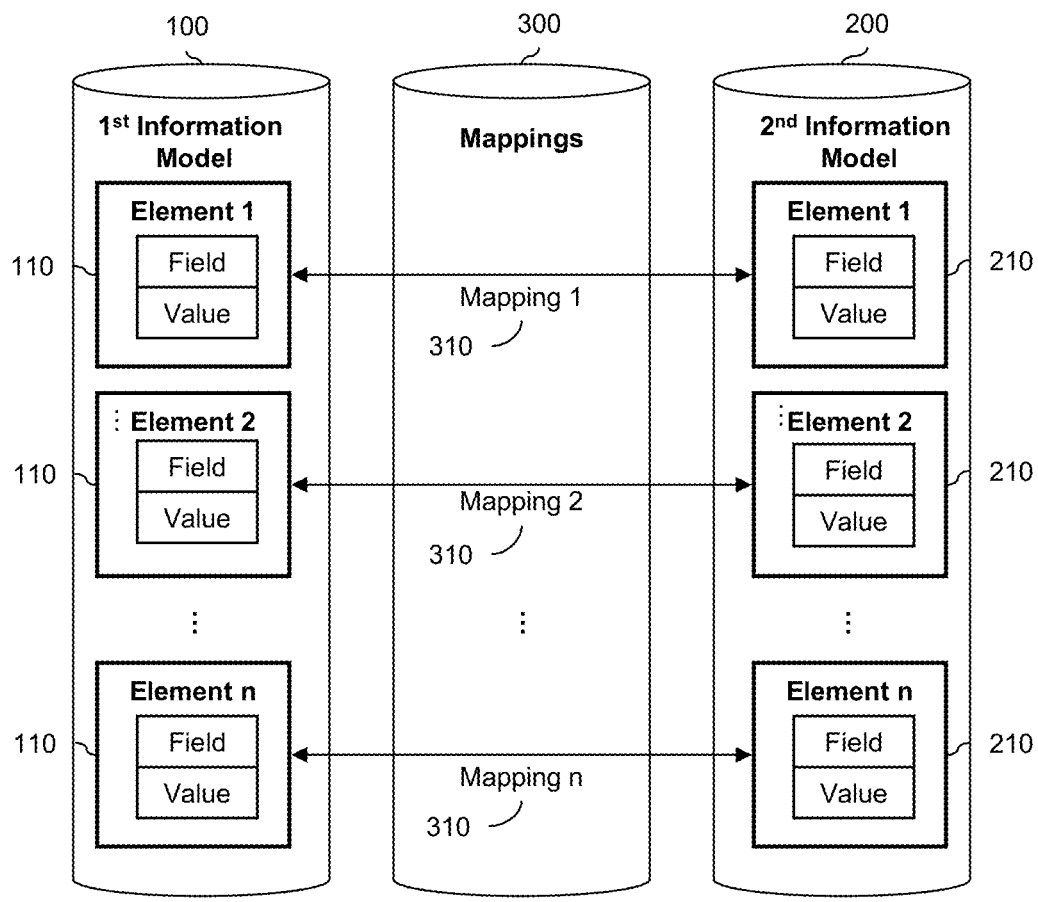
FIG. 2 is a block diagram that illustrates the details of a set of mappings between two information models, according to embodiments of the present invention.

FIG. 2 is a block diagram that illustrates the details of a set of mappings between two information models according to embodiments of the present invention. Referring to FIG. 2, the first information model 100 and the second information model 200 contain multiple elements 110, 210. Each element is associated with an identifier (also referred to herein as a "field identifier" or "field") and a value. The database of mappings 300 contains at least one mapping 310. Each mapping 310 is based on a matching of one or more elements in the first information model 110 to one or more elements in the second information model 210. For example, information model 100 and 200 each may contain data about customers. Element 1 of the first information model may have the field identifier "Customer Name" and the value "John Smith," and it may be mapped to element 1 of the second information model, which may have the field identifier "Person Name" and the value "John Q. Smith." Similarly, element 2 of the first information model may have the field identifier "Customer Zip Code" and the value "12980," and it may be mapped to element 2 of the second information model, which may have the field identifier "ZIP" and the value "12980-3456." As can be appreciated, these elements may have been mapped to each other because they have similar field identifiers and values, although these mappings may in fact be in error. For example, "John Smith" of the first information model may be a different person than "John Q. Smith" of the second information model. In a typical system, both information models may have thousands of elements.

Figure 4A:
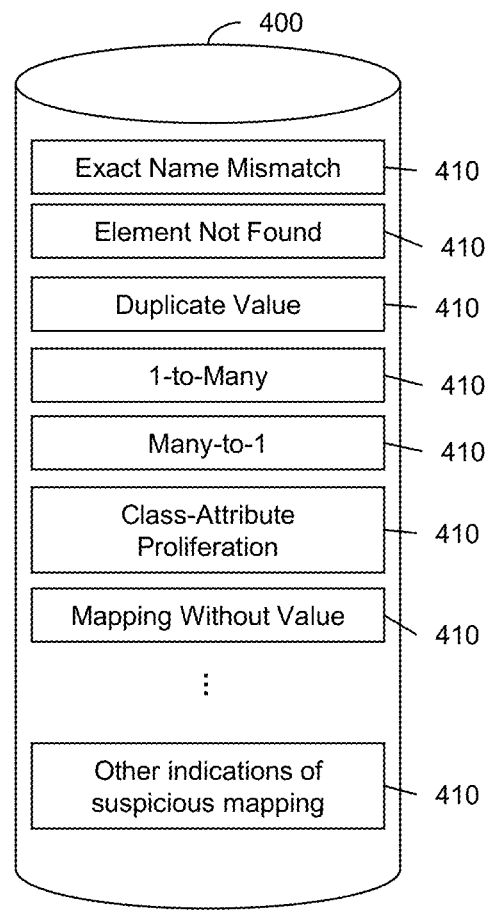
FIG. 4A is a block diagram that illustrates some examples of indications of a suspicious mapping stored in a database, according to embodiments of the present invention.
Figure 6:
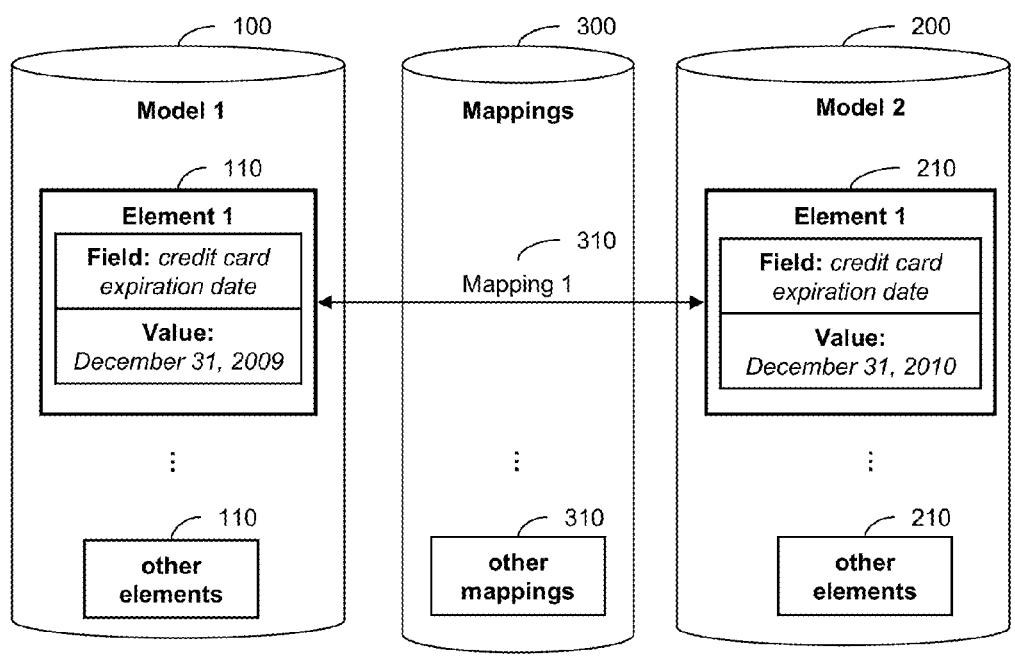
FIGS. 6-12 are block diagrams that illustrates examples of suspicious mappings, according to an embodiment of the present invention.

FIG. 4A is a block diagram that illustrates some examples of indications of a suspicious mapping stored in a database according to embodiments of the present invention. Referring to FIG. 4A, some examples of suspicious mappings 410 stored in the database 400 of indications of a suspicious mapping include:

(a) The situation where the name or the value of the element in the second information model does not match the name or the value of the element in the first information model, but there is another element in the second information model whose name and value perfectly match those of the element in the first information model ("exact name mismatch"). For example, the value of the element in the second information model may be "John Q. Smith" while the value of the element in the first information model may be "John Smith", and there is another element in the second model whose value is exactly "John Q. Smith". Another example is illustrated by FIG. 6. While this situation does not necessarily indicate an incorrect mapping, the mapping may nonetheless be determined to be suspicious so that the system can identify to a user that a potentially interesting alternative may have been missed.

Figure 7:
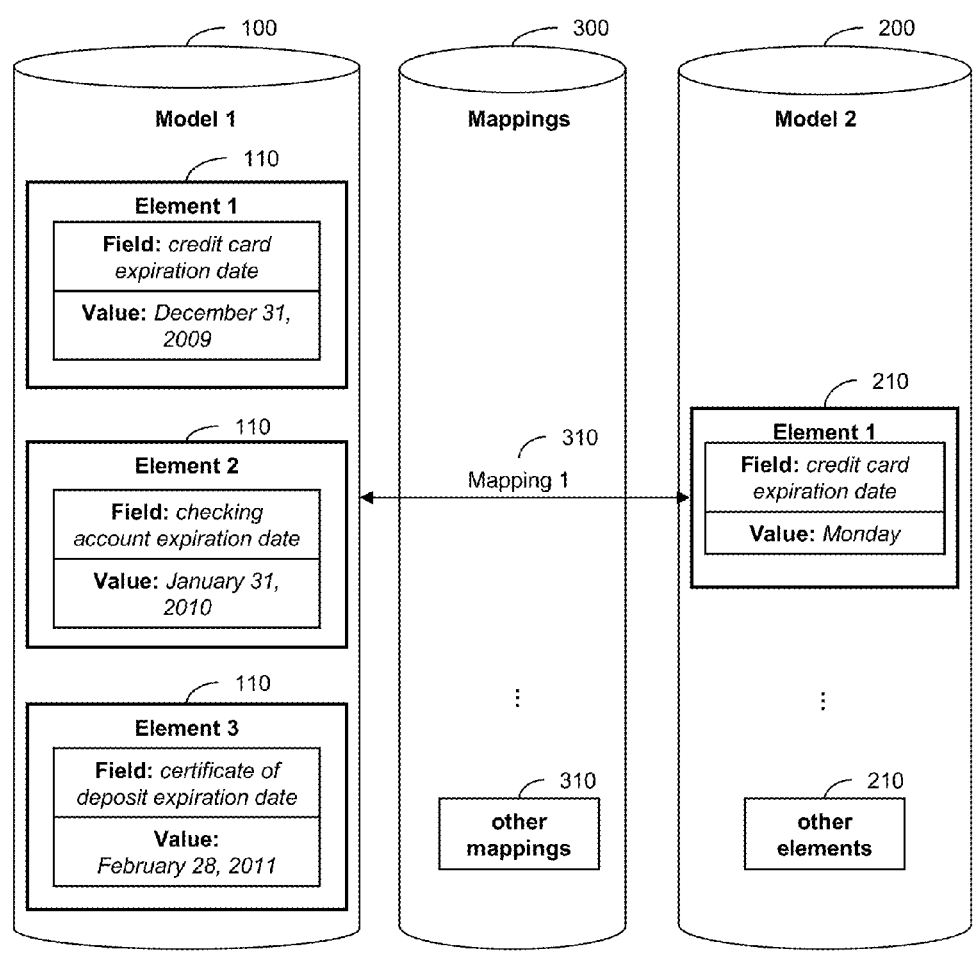

(b) The situation where the value of the element in the second information model does not match the value of any element in the first information model ("element not found"). In some embodiments, this indication may be assigned a high severity rating because it indicates that a mapping may be clearly suspicious or wrong. An example of this type of suspicious mapping is illustrated by FIG. 7.

Figure 8:
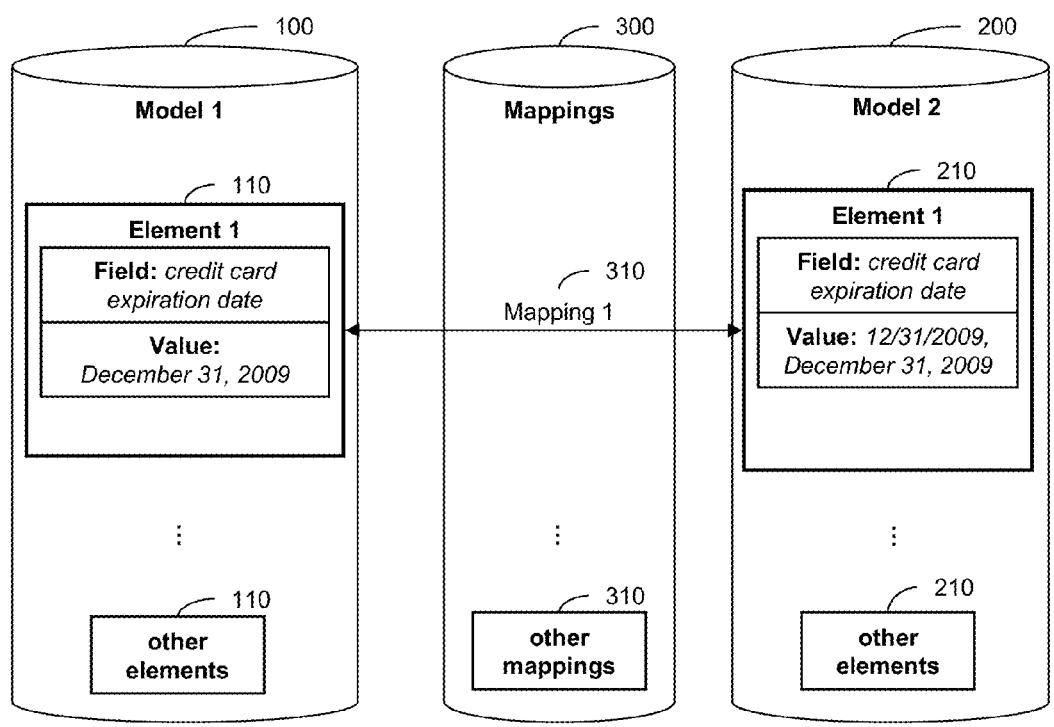

(c) The situation where the value of the element in the first information model is duplicated as part of the value of the element in the second information model ("duplicate value"). For example, the value of the element in the second information model may be "12980" while the value of the element in the first information model may be "12980-3456." Another example of this type of suspicious mapping is illustrated by FIG. 8.

Figure 9:
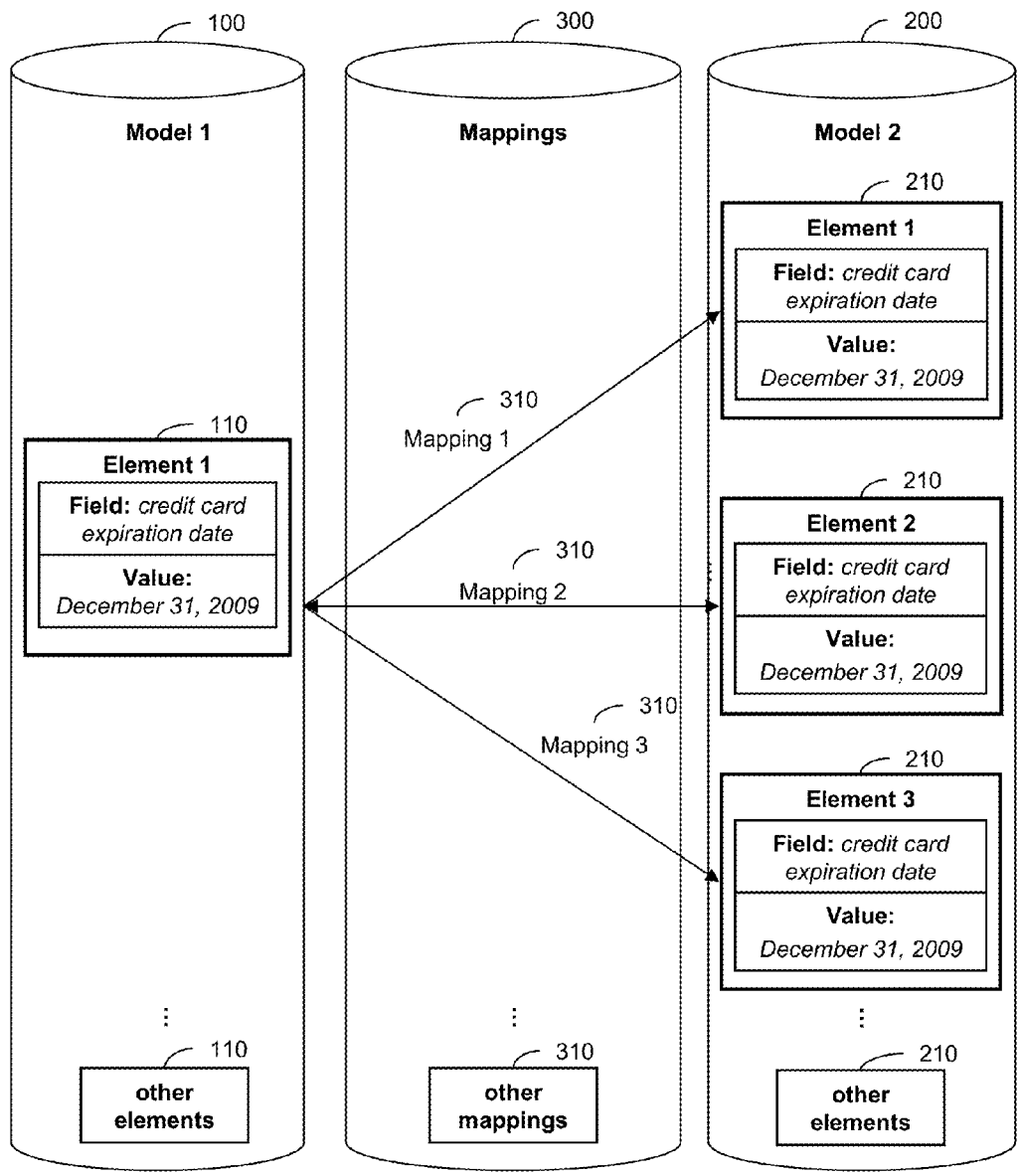

(d) The situation where the element in the first information model is mapped to a plurality of elements in the second information model ("1-to-many"), i.e., a single element in the first information model is mapped to a suspiciously large number elements in the second information model. An example of this type of suspicious mapping is illustrated by FIG. 9.

Figure 10:
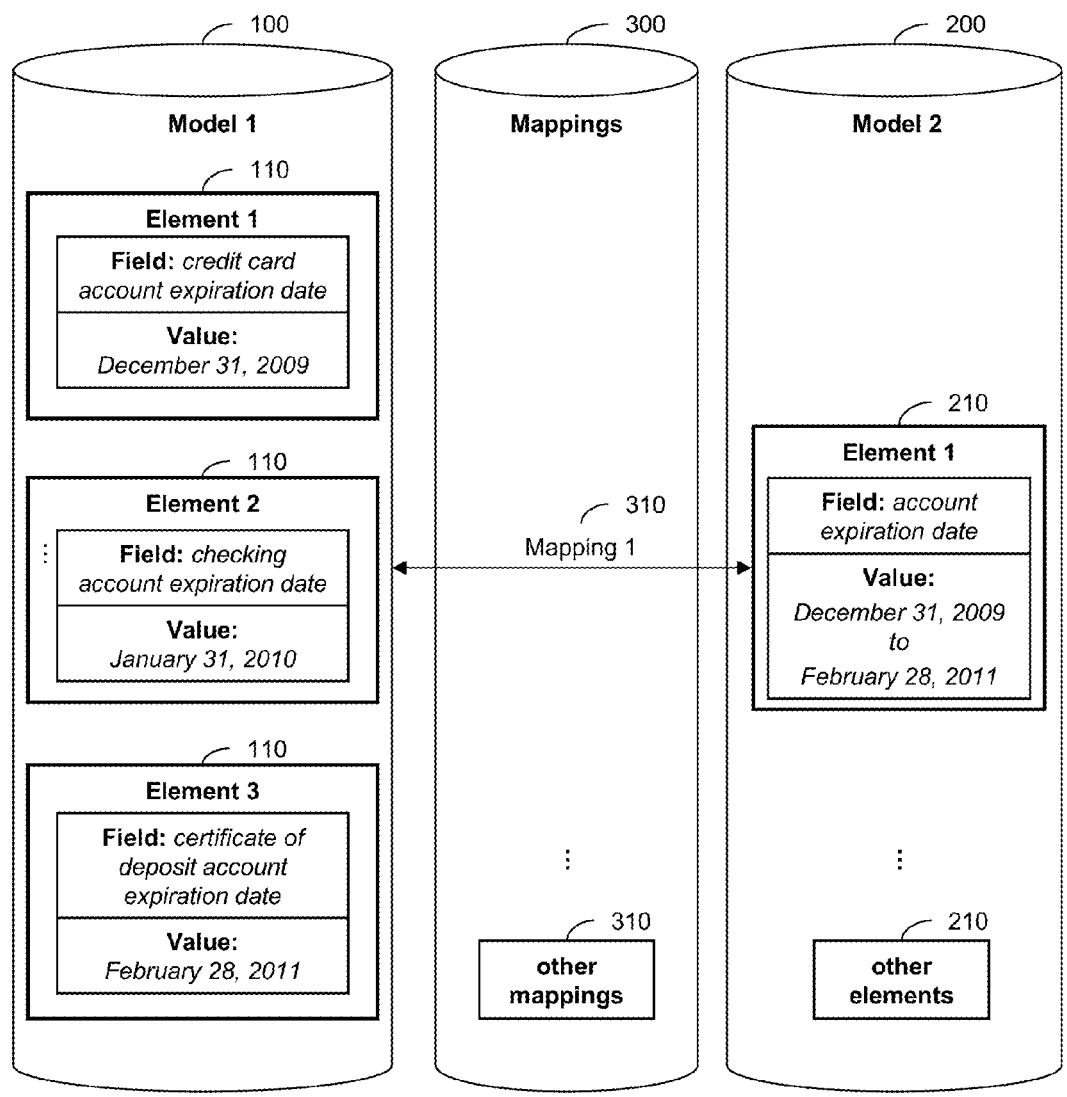

(e) The situation where a plurality of elements in the first information model is mapped to the element in the second information model ("many-to-1"). An example of this type of suspicious mapping is illustrated by FIG. 10.

Figure 11:
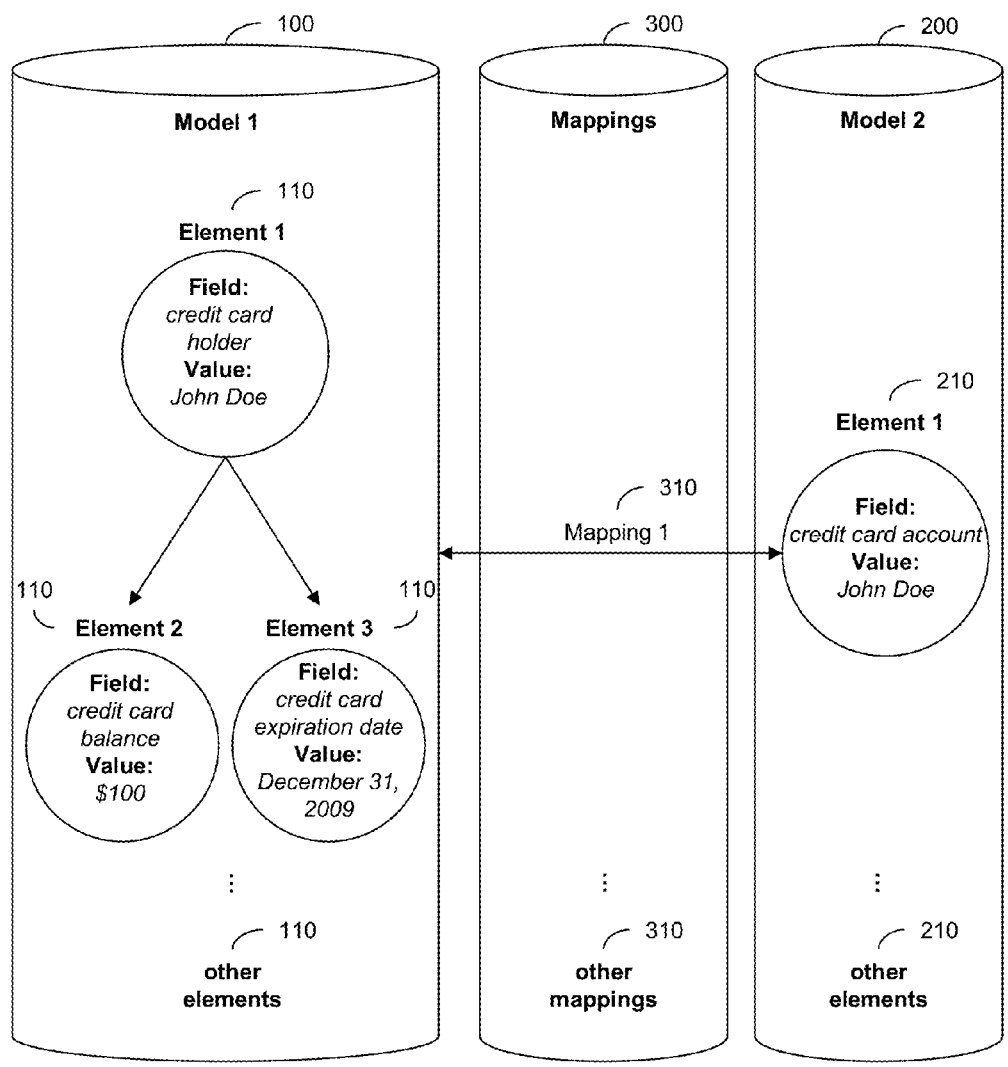

(f) The situation where the field identifier of the element in the second information model does not match the field identifier of the element in the first information model ("class-attribute proliferation"). For example, the field identifier in the second information model may be "Person Name" while the field identifier of the element in the first information model may be "Customer Name." Another example of this type of suspicious mapping is illustrated by FIG. 11.

Figure 12:
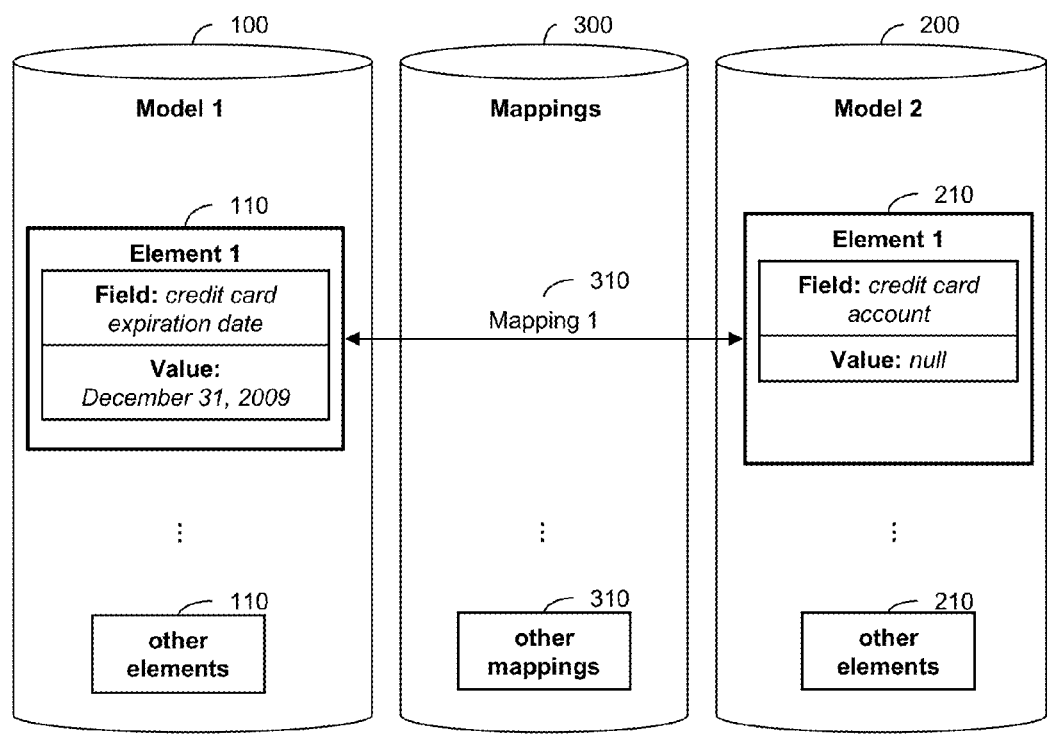

(g) The situation where the element in the second information model has no value (e.g., blank) and the element in the first information has a value ("mapping without value"). An example of this type of suspicious mapping is illustrated by FIG. 12.

Other indications of suspicious mappings 410 may be stored in the database 400 and/or may be specified by a user. Moreover, a mapping may resemble more than one indication of a suspicious mapping.

Figure 4B:
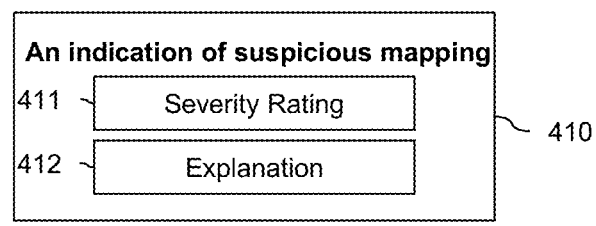
FIG. 4B is a block diagram that illustrates the details of an indication of a suspicious mapping, according to embodiments of the present invention.

FIG. 4B is a block diagram that illustrates the details of an indication of a suspicious mapping according to embodiments of the present invention. Referring to FIG. 4B, an indication of a suspicious mapping 410 has a severity rating 411, an explanation 412 associated with the indication of a suspicious mapping, and a pattern expression 413 encoding the suspicious mapping pattern to look for in the set of mappings 300. A high severity rating, for example, may indicate that a mapping is clearly suspicious or wrong. For example, the explanation 412 may be "element not found" and the severity rating may be "high." The pattern expression may take the form of a query (e.g. a query expressed in a pattern language such as SPARQL for information model represented as RDF) or of a sequence of program instructions to execute. The comparison between each indication of suspicious mapping 410 and the mapping 310 may be performed by evaluating the pattern expression against the considered mapping 310, the information model 100, the information model 200, and other mappings in 300. If the considered mapping 310 matches the pattern expression, then it is flagged as being suspicious, with the severity 411 and the explanation 412.

Figure 5:
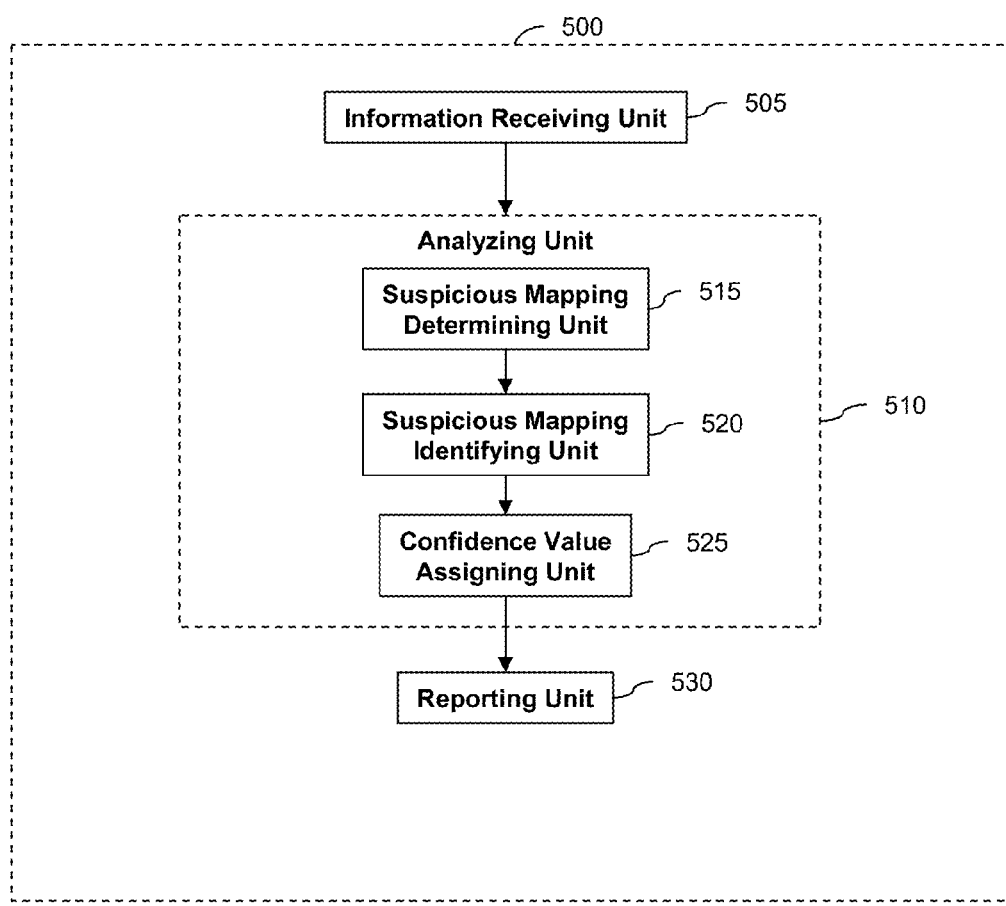
FIG. 5 is a block diagram that illustrates the details of the mapping review system, according to embodiments of the present invention.

FIG. 5 is a block diagram that illustrates the details of the mapping review system according to embodiments of the present invention. Referring to FIG. 5, the system 500 includes an information receiving unit 505, an analyzing unit 510, and a reporting unit 530. The information receiving unit 505 receives content from the first information model 100 and the second information model 200 after a mapping 310 has occurred. The information receiving unit 505 also receives an indication of a suspicious mapping 410 from the database of suspicious mappings 400. The analyzing unit 510 analyzes the mapping 310 between the information models 100, 200 based on the indication of a suspicious mapping 410 to determine if the mapping 310 is suspicious. The reporting unit 530 reports the mapping 310 as one that requires review if the mapping 310 is suspicious. In embodiments, the information receiving unit 505, an analyzing unit 510, and a reporting unit 530 are implemented as software instructions.

The analyzing unit 510 includes a suspicious mapping determining unit 515, a suspicious mapping identifying unit 520, and a confidence value assigning unit 525. The suspicious mapping comparing unit 515 determines whether the mapping 310 resembles the indication of a suspicious mapping 410. In 515, the comparison between an indication of a suspicious mapping 410 and the mapping 310 may be performed by evaluating the pattern expression 413 of 410 against the considered mapping 310, the first information model 100, the second information model 200, and other mappings in 300. If the considered mapping 310 matches the pattern expression, then the suspicious mapping identifying unit 520 identifies it as being suspicious. The confidence value assigning unit 525 assigns a confidence value to the mapping 310 based on whether the mapping 310 resembles the indication of a suspicious mapping 410 and based on the severity rating and the explanation associated with the indication of a suspicious mapping. For example, a mapping may be assigned a confidence value of 1 if it resembles a suspicious mapping and the severity rating is "high."

The identifying unit 530 includes a reporting unit 532. The reporting unit 532 generates a report of the suspicious mapping requiring review 600. The report may contain any or more of the following content to identify the mapping as one that requires review and to explain why the mapping has been determined to be suspicious:

(a) The indication of a suspicious mapping 410.
(b) The severity rating associated.
(c) The explanation associated with the indication of a suspicious mapping.
(d) The confidence value assigned to the mapping.
(e) The element in the first information model to be remapped 110.
(f) An alternate value for the element in the second information model 210.

FIGS. 6-12 are block diagrams that show different examples of suspicious mappings according to embodiments of the present invention. As in FIG. 2, FIGS. 6-12 show the first information model 100, the second information model 200, multiple elements 110, 210, and database of mappings 300 (including mapping 310).

FIG. 6 illustrates an example of a suspicious mapping in an "exact name mismatch" situation, where the value of the element in the second information model does not match the value of the element in the first information model after a mapping according to an embodiment of the present invention, but there is another element (element 2) in the second information model that exactly matches the element in the first information model. Referring to FIG. 6, the example shows that the value of element 1 in Model 2, "Dec. 31, 2010," does not match the value of element 1 in Model 1, "Dec. 31, 2009", but element 2 in Model 2 perfectly matches element 1 in Model 1.

FIG. 7 illustrates an example of a suspicious mapping in an "element not found" situation, where the value of the element in the second information does not match the value of any element in the first information model after a mapping according to an embodiment of the present invention. Referring to FIG. 7, the example shows that the value of Element 1 in Model 2, "Monday," does not match the value of any element, i.e., Elements 1, 2, or 3, in Model 1. The values of Elements 1, 2, and 3 are respectively "Dec. 31, 2009," "Jan. 31, 2010," and "Feb. 28, 2011."

FIG. 8 illustrates an example of a suspicious mapping in a "duplicate value or documentation" situation, where the value of the element in the first information model is duplicated as part of the value of the element in the second information model after a mapping according to an embodiment of the present invention. Referring to FIG. 8, the example shows that the value of Element 1 in Model 1, "Dec. 31, 2009," has been duplicated as part of the value of Element 1 in Model 2. The value of Element 1 in Model 2 is "12/31/2009, Dec. 31, 2009." It should contain either "12/31/2009" or "Dec. 31, 2009," but not both.

FIG. 9 illustrates an example of a suspicious mapping in a "1-to-many" situation, where an element in the first information model is mapped to many elements in the second information model according to an embodiment of the present invention. Referring to FIG. 9, the example shows that Element 1 in Model 1 has been erroneously mapped to multiple elements in Model 2, i.e., Elements 1, 2, and 3 when Element 1 should only be mapped to a single element in Model 2.

FIG. 10 illustrates an example of a suspicious mapping in a "many-to-1" situation, where an element in the first information model is mapped to many elements in the second information model according to an embodiment of the present invention. Referring to FIG. 10, the example shows that Elements 1, 2, and 3 in Model 1 have been erroneously mapped to a single element in Model 2 when those elements in Model 1 should be mapped to three corresponding elements in Model 2. In this example, a "credit card account expiration date" is different from a "checking account expiration date" and a "certificate of deposit account expiration date" in Model 1. As such, the "account expiration date" in Model 2 that includes or concatenates the values from those three elements in Model 1 shows an indication of a suspicious mapping.

FIG. 11 illustrates an example of a suspicious mapping in a "class-attribute proliferation" situation, where the field of the element in the second information model does not match the field of the element in the first information model according to an embodiment of the present invention. Referring to FIG. 11, the example shows that the field of Element 1 in Model 2, "credit card account," does not match the field of Element 1 in Model 1, "credit card holder."

FIG. 12 illustrates an example of a suspicious mapping in a "mapping without value or documentation" situation, where the field of the element in the second information model does not match the field of the element in the first information model according to an embodiment of the present invention. Referring to FIG. 12, the example shows that the value of Element 1 in Model 2 is null but a value exists for Element 1 in Model 1.

Figure 13:
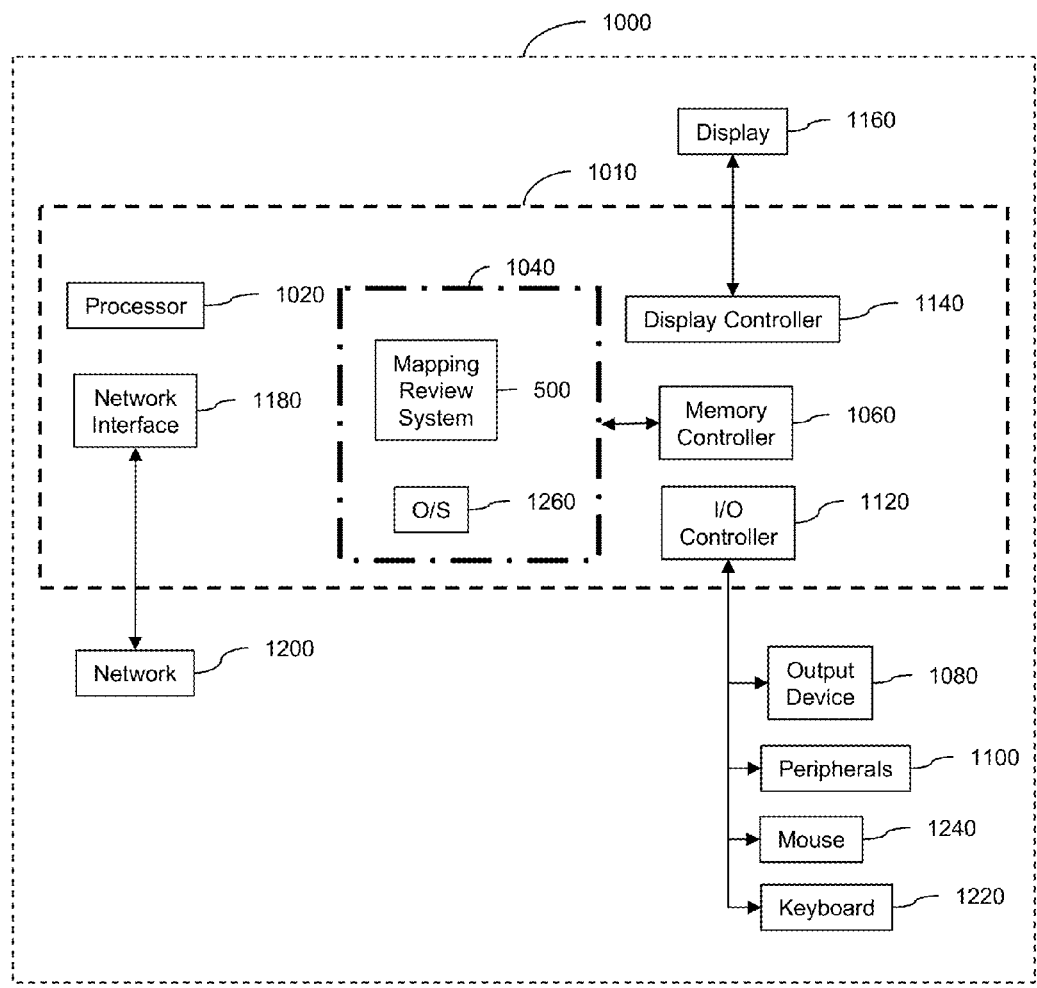
FIG. 13 is a block diagram that illustrates a computer-implemented system that includes the mapping review system according to embodiments of the present invention.

FIG. 13 is a block diagram that illustrates a computer-implemented system that includes the mapping review system according to embodiments of the present invention. Referring to FIG. 13, an exemplary computing system 1000 includes a mapping review system 500 in a computer 1010. As can be appreciated, the computing system 1000 can include any computing device, including but not limited to, a desktop computer, a laptop, a server, a portable handheld device, or any other electronic device. For ease of the discussion, an embodiment of the invention will be discussed in the context of the computer 1010.

The computer 1010 is shown to include a processor 1020, memory 1040 coupled to a memory controller 1060, one or more input and/or output (I/O) devices, peripherals 1080, 1100 that are communicatively coupled via a local input/output controller 1120, and a display controller 1180 coupled to a display 1160. In an exemplary embodiment, the system 1000 can further include a network interface 1140 for coupling to a network 1200. The network 1200 transmits and receives data between the computer 1010 and external systems. In an exemplary embodiment, a conventional keyboard 1220 and mouse 1240 can be coupled to the input/output controller 1200.

In various embodiments, the memory 1040 stores instructions that can be executed by the processor 1020. The instructions stored in memory 1040 may include one or more separate programs, each of which comprises an ordered listing of executable instructions for implementing logical functions. In the example of FIG. 13, the instructions stored in the memory 1040 include at least a suitable operating system (OS) 1260 and mapping review system 500. The operating system 1260 essentially controls the execution of other computer programs and provides scheduling, input-output control, file and data management, memory management, and communication control and related services.

When the computer 1010 is in operation, the processor 1020 is configured to execute the instructions stored within the memory 1040, to communicate data to and from the memory 1040, and to generally control operations of the computer 1010 pursuant to the instructions. The processor 1020 can be any custom made or commercially available processor, a central processing unit (CPU), an auxiliary processor among several processors associated with the computer 1010, a semiconductor based microprocessor (in the form of a microchip or chip set), a macroprocessor, or generally any device for executing instructions.

The processor 1020 executes the instructions of the mapping review system 500 according to embodiments of the present invention. In various embodiments, the mapping review system 500 of the present invention is stored in the memory 1040 (as shown), is executed from a portable storage device (e.g., CD-ROM, Diskette, FlashDrive, etc.) (not shown), and/or is run from a remote location such as from a central server (not shown). Mapping review system 500 may be a software application that carries out a process such as described below with reference to FIG. 14. In embodiments, memory 1040 also stores data, such as $1^{st}$ and $2^{nd}$ information model 100 and 200, mappings 300, indications of suspect mappings 400, a suspicious mappings requiring review 600 that are shown in FIG. 1.

According to another embodiment of the present invention, a computer-implemented method is provided for automatically reviewing a mapping between information models.

Figure 14:
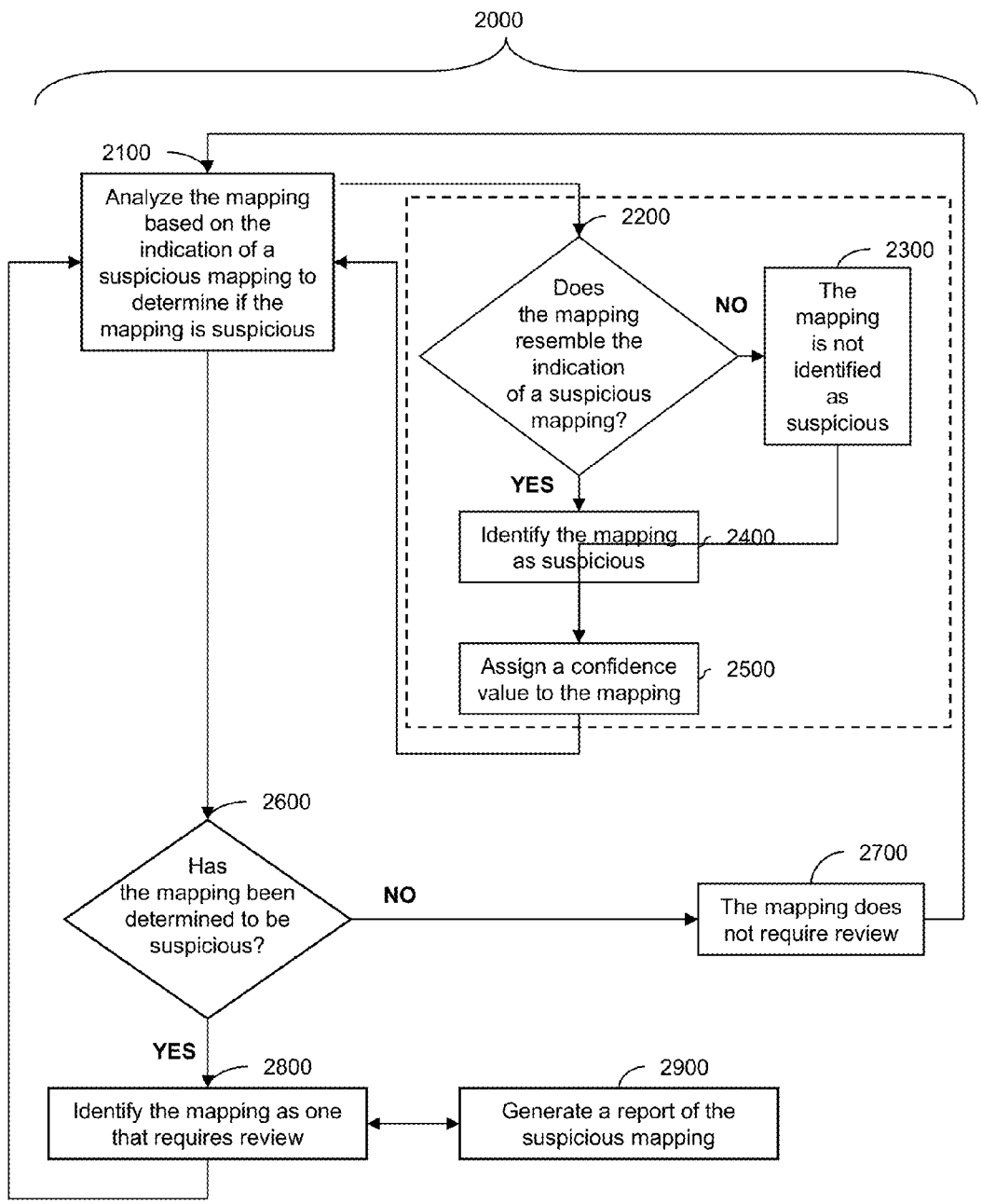
FIG. 14 is a flow chart that illustrates a computer-implemented method of automatically reviewing mappings between information models, according to embodiments of the present invention.

FIG. 14 is a flowchart that illustrates a computer-implemented method of automatically reviewing a mapping between information models according to embodiments of the present invention. In one embodiment, the method 2000 starts at the analyzing step 2100, where the method 2000 analyzes the mapping based on an indication of a suspicious mapping to determine if the mapping is suspicious. For example, this method may be used to analyze mappings 300 using indications of suspicious mapping 400, both shown in FIG. 1.

In one embodiment of the present invention, the analyzing step starts at step 2200, where the method 2000 checks to see if the mapping resembles the indication of a suspicious mapping. The mapping review system receives a mapping between an element in the first information model to an element in the second information model. The mapping may be received as an input to the computing system that contains the mapping review system, and/or the mapping may be received by the mapping review system from a memory on the computer system. Each element in the information models is associated with an element identifier and an element value, and the mapping signifies a relationship between the element in the first information model and the element in the second information model. The received mappings are then compared against one or more known indications of suspicious mappings to determine if the received mappings resemble one of the indications of suspicious mappings. The mapping is analyzed based on an indication of a suspicious mapping to determine if the mapping is suspicious, wherein the first and second information models each contain at least one element that has a field and a value associated with the field, and wherein the mapping is based on a matching of an element in the first information model to an element in the second information model. If the mapping resembles the indication of a suspicious mapping, the method 2000 then identifies the mapping as suspicious at step 2400. The mapping resembles an indication of suspicious mapping 410 if and only if the pattern expression 413 of 410, evaluated against the considered mapping 310 (and possibly also, for example, the first information model, the second information model, and the other mappings between the two models) matches the mapping 310. Subsequently, the method 2000 assigns a confidence value to the mapping at step 2500. The confidence value is based on whether the mapping resembles the indication of a suspicious mapping and based on a severity rating and an explanation associated with the indication of a suspicious mapping. If the mapping does not resemble the indication of a suspicious mapping, then, as shown at step 2300, the mapping is not identified as suspicious. The analyzing step 2100 may iterate to analyze the mapping between the information models where there are multiple indications of a suspicious mapping.

At step 2600, the method 2000 checks to see if the mapping has been determined to be suspicious. If the mapping has been determined to be suspicious, the method 2000, at step 2800, identifies the mapping as one that requires review. In one embodiment of the present invention, the step of identifying the mapping as one that requires review 2800 may include step 2900, where the method 2000 generates a report of the suspicious mapping. If the mapping has not been determined to be suspicious, then, at step 2700, the mapping does not require review and the method 2000 may iterate to assess each mapping between the information models where there are multiple mappings.

As will be appreciated by one skilled in the art, aspects of the present invention may be embodied as a system or method (as described above) or as a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 15:
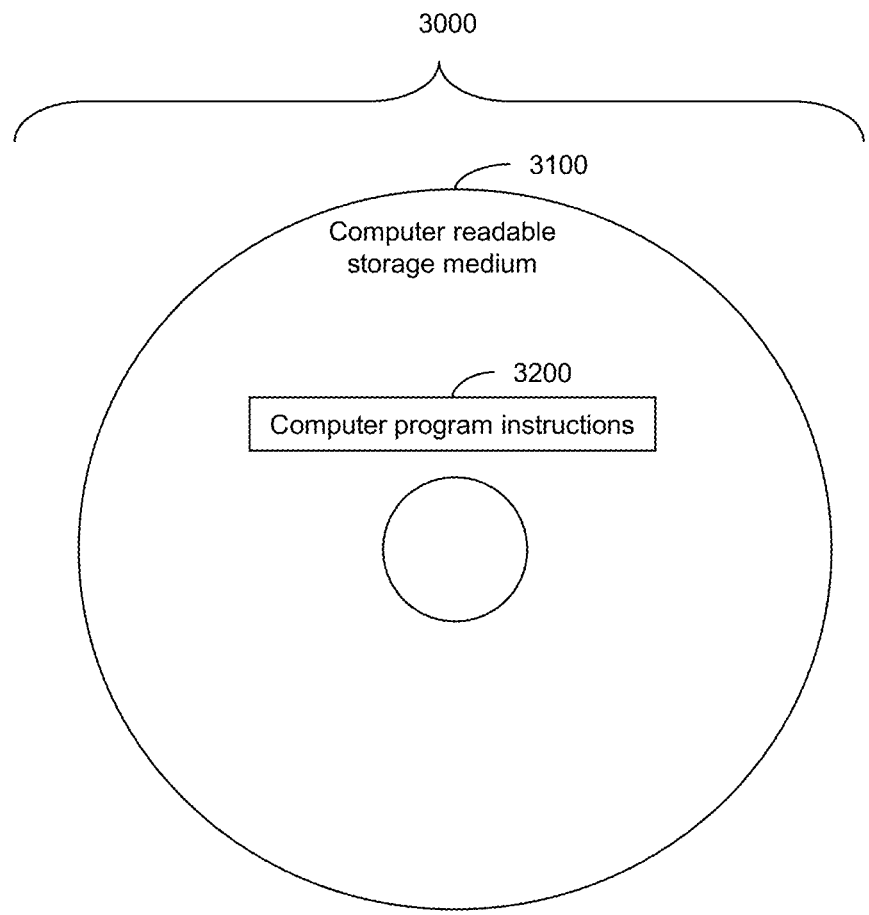
FIG. 15 shows a computer program product for automatically reviewing a mapping between information models, according to embodiments of the present invention.

FIG. 15 shows a computer program product for automatically reviewing a mapping between information models according to embodiments of the present invention. The computer program product 3000 includes computer program instructions 3200 for carrying out the steps of the method 2000 according to an embodiment of the present invention, as discussed above. As shown, computer program instructions 3200 are stored on a computer readable storage medium 3100, as discussed below.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer-implemented method of automatically reviewing relationship mappings between elements of a first information model and a second information model, comprising:

receiving a relationship mapping regarding a first element in the first information model to a second element in the second information model that is different from the first information model, each element being associated with an element identifier and an element value;

evaluating a pattern expression against the relationship mapping, the pattern expression encoding a plurality of known indications of suspicious mappings, the plurality of known indications of suspicious mappings comprising:

a first suspicious situation where the mapping relationship indicates that the element value of the second element does not match the element value of the first element and there is a third element in the second information model that perfectly matches the first element;

a second suspicious situation where the mapping relationship indicates that the element value of the first element is duplicated as part of the element value of the second element;

a third suspicious situation where the mapping relationship indicates that the first element is mapped to a plurality of elements in the second information model, including the second element;

a fourth suspicious situation where the mapping relationship indicates that a plurality of elements in the first information model is mapped to the second element;

a fifth suspicious situation where the mapping relationship indicates that the element identifier of the second element does not match the element identifier of the first element; and a sixth suspicious situation where the mapping relationship indicates that the value of the element value of the second element has no value and the element value of the first element has a value; and identifying the relationship mapping as a review mapping during the evaluating of the pattern expression against the relationship mapping, the identifying of the relationship mapping as the review mapping includes assigning a confidence value to the review mapping, the confidence value corresponding to the pattern expression, a severity rating, and an explanation associated with the each of the plurality of the known indications of suspicious mappings.

2. The method of claim 1, wherein the pattern expression is stored a query in a query language.

3. The method according to claim 1, wherein identifying the relationship mapping as the review mapping further comprises:

assigning the confidence value to the review mapping based on whether the relationship mapping resembles an indication of the plurality of known indications of suspicious mappings, the severity rating, and the explanation associated with that indication.

4. The method according to claim 1, wherein an indication of the plurality of known indications of suspicious mappings is specified by a user.

5. The method according to claim 4, wherein a content of a report is selected from a group consisting of:

an indication of the plurality of known indications of suspicious mappings that resembles the relationship mapping;

the severity rating associated with the indication of the plurality of known indications of suspicious mappings;

the explanation associated with the indication of the plurality of known indications of suspicious mappings;

the confidence value assigned to the review mapping;

a first element in the first information model to be remapped; and an alternate value for the second element in the second information model.

6. The method according to claim 1, wherein an indication of the plurality of known indications suspicious mappings is learned from a review of the plurality of known indications of suspicious mappings that are consistently rejected by a user.

7. A computer program product for automatically reviewing a relationship mapping between elements of information models, said computer program product comprising:

a non-transitory computer readable storage medium having computer readable program code embodied therewith to perform the following:

receiving the relationship mapping regarding a first element in the first information model to a second element in the second information model that is different from the first information model, each element being associated with an element identifier and an element value;

evaluating a pattern expression against the relationship mapping, the pattern expression encoding a plurality of known indications of suspicious mappings, the plurality of known indications of suspicious mappings comprising:

a first suspicious situation where the mapping relationship indicates that the element value of the second element does not match the element value of the first element and there is a third element in the second information model that perfectly matches the first element;

a second suspicious situation where the mapping relationship indicates that the element value of the first element is duplicated as part of the element value of the second element;

a third suspicious situation where the mapping relationship indicates that the first element is mapped to a plurality of elements in the second information model, including the second element;

a fourth suspicious situation where the mapping relationship indicates that a plurality of elements in the first information model is mapped to the second element;

a fifth suspicious situation where the mapping relationship indicates that the element identifier of the second element does not match the element identifier of the first element; and a sixth suspicious situation where the mapping relationship indicates that the value of the element value of the second element has no value and the element value of the first element has a value; and identifying the relationship mapping as a review mapping during the evaluating of the pattern expression against the relationship mapping, the identifying of the relationship mapping as the review mapping includes assigning a confidence value to the review mapping, the confidence value corresponding to a pattern expression, the severity rating, and an explanation associated with the plurality of known indications of suspicious mappings.

8. The computer program product of claim 7, wherein identifying the relationship mapping as the review mapping further comprises:

assigning the confidence value to the mapping based on whether the relationship mapping resembles an indication of the plurality of known indications of suspicious mappings, the severity rating, and the explanation associated with that indication.

9. The computer program product of claim 7, wherein an indication of the plurality of known indications of suspicious mappings is specified by a user.

10. The computer program product of claim 7, wherein the plurality of known indications of suspicious mappings is assigned a high severity rating if that indication is the a situation where the element value in the second information model does not match any element value in the first information model.

11. The computer program product of claim 7, further comprising:

in response to the identifying of the relationship mapping as the review mapping, generating a report of the mapping that requires review.

12. The method according to claim 1, wherein the first and second information models are selected from a rational data architect model and a data warehouse model.

13. The method according to claim 1, wherein the severity rating indicates that a mapping is clearly suspicious or wrong.

14. The method according to claim 1, wherein the pattern expression is in a query or a sequence of program instructions.

15. The method according to claim 1, wherein
when the relationship mapping matches the pattern expression, then the relationship mapping is flagged as being suspicious, with the severity and the explanation.

* * * * *